May 23, 1961 D. R. RASMUSSON ET AL 2,985,383
HORN AND HOSE ASSEMBLY FOR CARBON DIOXIDE FIRE EXTINGUISHING APPARATUS
Filed March 19, 1959
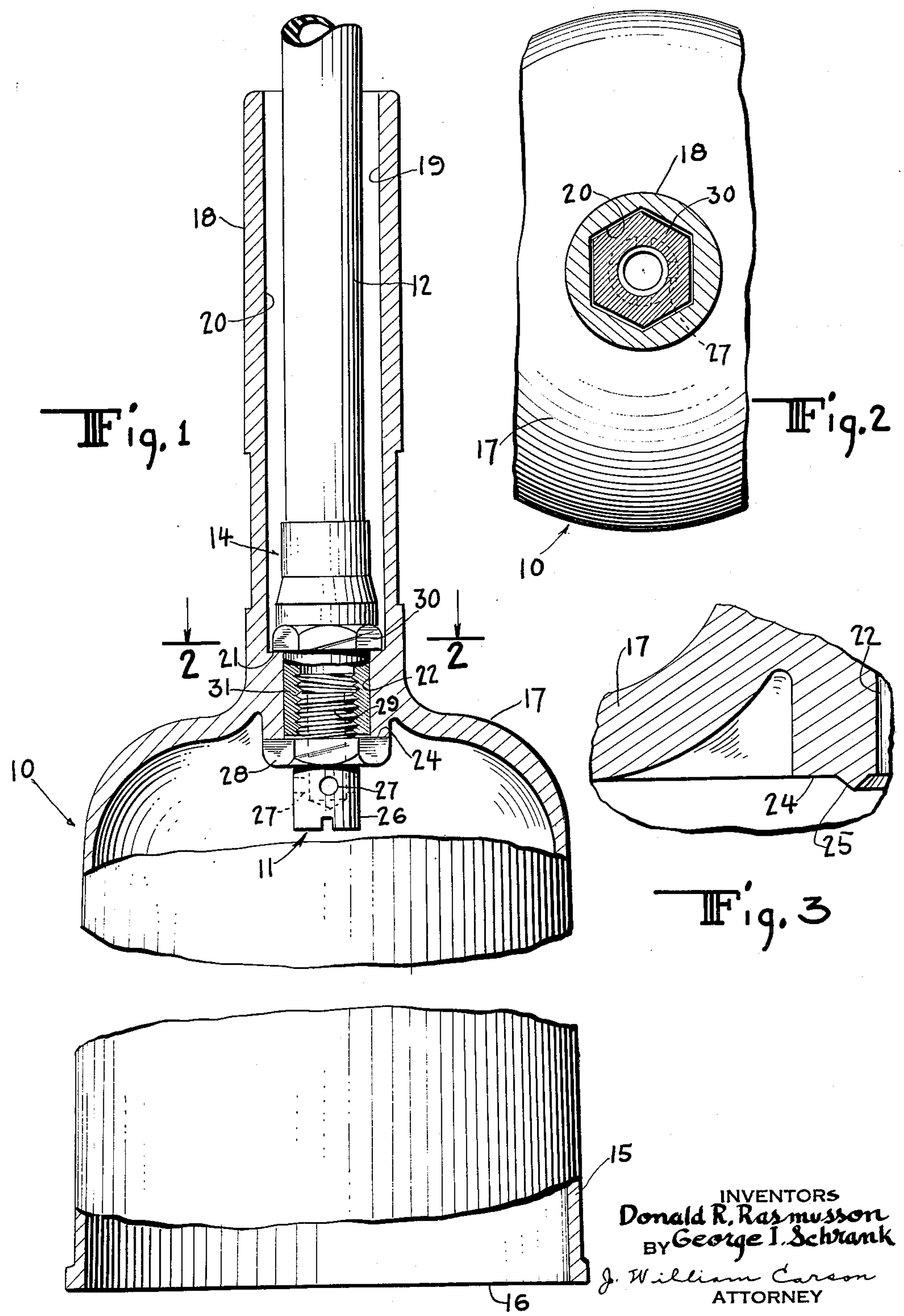
INVENTORS
Donald R. Rasmusson
BY George I. Schrank
J. William Carson
ATTORNEY United States Patent Office 2,985,383

Patented May 23, 1961

2,985,383

HORN AND HOSE ASSEMBLY FOR CARBON DIOXIDE FIRE EXTINGUISHING APPARATUS

Donald R. Rasmusson, Montclair, and George I. Schrank, Teaneck, N.J., assignors to Specialties Development Corporation, Belleville, N.J., a corporation of New Jersey Filed Mar. 19, 1959, Ser. No. 800,501

5 Claims. (Cl. 239—288)

The present invention relates to carbon dioxide fire extinguishing apparatus, and, more particularly, to an improved horn and hose assembly for such apparatus.

Heretofore, there has been used an approved horn and hose assembly for carbon dioxide fire extinguishers which comprises a molded plastic resin horn or shield having an open end and a thick end wall opposite the open end formed with a bore, a thin metallic internally threaded sleeve secured in the bore, a nozzle threaded into the sleeve having one end extending into the horn and being internally threaded at its other end, a rubber or wooden handle having a bore extending therethrough, a nipple in the bore of the handle having external threads at both ends with one end threaded into the nozzle, a hose, and a fitting secured to the end of the hose having an internally threaded coupling threaded onto the other end of the nipple.

Such an assembly comprises seven parts, namely, the horn, the sleeve, the nozzle, the handle, the nipple, the hose and the fitting, of which six parts must be handled in assembling the horn and hose, the sleeve usually being molded into the horn to define the bore. Also, such an assembly requires six operations to form the threads on the sleeve, the nozzle (externally and internally), the nipple (both ends), and the coupling of the fitting; and requires three threading operations to secure the nozzle into the sleeve, the nipple into the nozzle, and the nipple into the coupling. These threaded connections provide three leakage points in the event the connections are loosened.

The number of parts, and the number of fabricating and assembling operations heretofore required materially increased the cost of labor and materials in making such an assembly.

Accordingly, an object of the present invention is to provide an improved horn and hose assembly which requires fewer parts and fewer fabricating and assembling operations and therefore is more economical to manufacture and assemble.

Another object is to provide such an assembly which is attractive in appearance but yet is rugged in construction and can withstand such rough usage to which it may be subjected.

A further object is to provide such an assembly which is less likely to come apart and has fewer points of possible leakage than prior horn and hose assembles.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Fig. 1 is a fragmentary longitudinal sectional view of a horn and hose assembly in accordance with the present invention.

Fig. 2 is a sectional view taken along the line 2—2 on Fig. 1.

Fig. 3 is an enlarged fragmentary sectional view of a detail of the horn.

Referring to the drawing in detail, a horn and hose assembly is shown which generally comprises a horn 10, a nozzle 11, a hose 12, and a fitting 14 secured to the hose in a conventional manner as in the past.

The horn 10 may have a generally cylindrical side wall 15, as shown, or may be oval and flared if desired, and has an open end 16 and an end wall 17 opposite its open end. Preferably, the horn is formed of a molded plastic resin and can thereby be integrally formed with a handle 18 extending outwardly from the end wall 17.

The handle 18 has a stepped bore 19 extending therethrough and through the end wall 17 which bore includes a non-circular or polygonal portion 20 extending from the outer end of the handle to the step 21 of the bore and a circular portion 22 extending from the step to the interior of the horn.

Preferably, for the purpose to be explained hereinafter, the inner side of the end wall 17 is formed with a seat 24 surrounding the bore portion 22 and having an annular rib 25 thereon (Fig. 3).

The nozzle 11 comprises a portion 26 disposed within the horn and provided with a plurality of discharge orifices 27, a head portion 28 which preferably is polygonal to facilitate the application of a wrench or other tool thereto, and an externally threaded nipple portion 29 extending into the circular bore portion 22. The head portion 28 may also be provided with a slot 32 for receiving a tool.

The fitting 14 includes a non-circular head 30 mating with and held against rotation by the non-circular bore portion 20 and abutting the step 21, and an internally threaded coupling 31 fitted in the non-circular bore portion 20 and threaded onto the nipple portion 29.

The hose extends outwardly of the bore 19 to a source of carbon dioxide (not shown).

In assembling the horn 10 and the fitting 14 already having the hose secured thereto, the coupling 31 is inserted into the bore portion 22, with the head 30 abutting the step 21 and held against rotation by the non-circular bore portion 20, and the nipple portion 29 of the nozzle is screw threaded into the coupling until the head portion 28 of the nozzle abuts the seat 24. Torque is then applied to the nozzle to firmly secure the same to the coupling, whereby the horn, the nozzle and the fitting with the hose thereon are held in assembly. This causes the head 28 portion of the nozzle and the seat 24 to cooperate to provide a pressure tight seal between the interior of the horn and the bore of the handle so that carbon dioxide cannot escape into the handle bore and cool the handle to an extent that it cannot be held by hand.

Such a seal may be improved by the provision of the rib 25 on the seat which is formed of the same material as the horn, for example, a polyethylene plastic, which rib, by being triangular in section as shown in Fig. 3, is readily deformed by the head portion 28 upon application of torque to provide a continuous annular sealing zone between the seat and the head portion, whereby neither the seat need be molded nor the head portion need be machined within close tolerances.

From the foregoing description, it will be seen that the present invention provides a greatly simplified horn and hose assembly which requires only four parts, namely, the horn, the nozzle, the fitting and the hose. Only two screw thread machining operations are required to form the threads on the nozzle and the coupling of the fitting, and only two assembly operations are required, namely, the pre-assembly of the hose and the fitting and the final assembly of the horn and the fitting by means of the nozzle.

Also, by using only one set of screw threads to provide connections in the carbon dioxide flow conducting passageway, leakage points are reduced to a minimum. Furthermore, any leakage of carbon dioxide that might possibly occur between the nipple portion and the coupling is prevented from getting into the handle bore by reason of the seal provided by the head of the fitting in firm engagement with the step of the bore.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A horn and hose assembly for discharging carbon dioxide comprising a horn having an open end and an end wall opposite the open end and being integrally formed with a handle extending outwardly from said wall, said handle having a bore extending therethrough provided with a step and including a non-circular portion extending from the outer end of said handle to said step and a second portion extending from said step to the interior of said horn; a hose; a coupling secured to the end of said hose including a non-circular head mating with and held against rotation by said non-circular bore portion and adjacent said step and a tubular, internally threaded section extending into said second bore portion; and a nozzle member formed with a head portion and having an externally threaded nipple portion secured into said internally threaded section of said coupling to cause said head portion to abut said wall and to cause said head to abut said step, whereby said horn, said coupling and said nozzle member are held in assembly.

2. An assembly according to claim 1, wherein said head portion of said nozzle member is polygonal to facilitate its engagement by a tool to effect securement of said nozzle member to said coupling.

3. An assembly according to claim 1, wherein said end wall is formed with an annular seat surrounding said bore against which said head portion abuts.

4. An assembly according to claim 3, wherein said horn is formed of plastic resin and said seat has an annular deformable rib thereon which is deformed by said head portion to form a seal between the interior of said horn and the bore of said handle.

5. An assembly according to claim 1, wherein said nozzle has a slot for receiving a tool to facilitate securement of said nozzle member to said coupling.

References Cited in the file of this patent

UNITED STATES PATENTS 1,274,988 Chadwick ............ Aug. 6, 1918
1,561,275 Page ............ Nov. 10, 1925
1,736,888 Selah ............ Nov. 26, 1929
1,855,447 Hagstedt ............ Apr. 26, 1932
2,545,951 Frese et al. ............ Mar. 20, 1951
2,569,489 Newman ............ Oct. 2, 1951
2,595,774 De Ment ............ May 6, 1952
2,681,707 Mapes ............ June 22, 1954

FOREIGN PATENTS 849,763 France ............ Feb. 2, 1939